(12) United States Patent
Orbigo et al.

(10) Patent No.: US 11,223,960 B2
(45) Date of Patent: Jan. 11, 2022

(54) NETWORK PLANNING TOOL FOR FORECASTING IN TELECOMMUNICATIONS NETWORKS

(71) Applicant: T-Mobile USA, Inc., Bellevue, WA (US)

(72) Inventors: Allan Orbigo, Bothell, WA (US); Christopher P. Chorney, Seattle, WA (US); Dennis Jarret Guill, Jr., Richardson, TX (US); Phillip Kent Prince, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 97 days.

(21) Appl. No.: 15/931,567

(22) Filed: May 13, 2020

(65) Prior Publication Data
US 2021/0360424 A1 Nov. 18, 2021

(51) Int. Cl.
*H04W 16/18* (2009.01)
*H04W 64/00* (2009.01)
*H04W 24/02* (2009.01)

(52) U.S. Cl.
CPC ........... *H04W 16/18* (2013.01); *H04W 24/02* (2013.01); *H04W 64/003* (2013.01)

(58) Field of Classification Search
CPC .... H04W 16/18; H04W 24/02; H04W 64/003
See application file for complete search history.

(56) References Cited

U.S. PATENT DOCUMENTS

| 6,094,580 | A | 7/2000 | Yu et al. |
| 6,856,803 | B1 | 2/2005 | Gross et al. |
| 7,113,793 | B2 * | 9/2006 | Veerasamy ........... H04W 16/18 380/270 |
| 7,206,584 | B2 | 4/2007 | Abusch-Magder et al. |
| 7,840,219 | B2 | 11/2010 | Ludovico et al. |
| 7,920,876 | B2 * | 4/2011 | Rahman ................ H04W 4/029 455/456.1 |
| 8,400,981 | B1 | 3/2013 | Hobson et al. |
| 9,536,021 | B1 | 1/2017 | Link et al. |
| 9,706,411 | B2 | 7/2017 | Goswami et al. |

(Continued)

FOREIGN PATENT DOCUMENTS

| EP | 2949143 B1 | 7/2018 |
| JP | 6149538 B2 | 6/2017 |

*Primary Examiner* — Liton Miah
(74) *Attorney, Agent, or Firm* — Perkins Coie LLP

(57) ABSTRACT

The disclosed embodiments include a method for forecasting a coverage area of a candidate site in an anchor network. The method can include obtaining cell site information of anchor networks and of the candidate site (e.g., a donor site of a donor network), simulating a spatial layout of the anchor sites in a virtual network, and estimating a coverage area of the candidate site in the virtual network. The estimated coverage area of the candidate site forms a polygon-shaped coverage area in the spatial layout of the virtual network. The method can further include modifying the polygon-shaped coverage area of the candidate site relative to an intersection with a coverage area of a neighboring site, pruning the modified coverage area of any portion that exceeds a predefined coverage radius, and causing an output including the pruned coverage area of the candidate site as an indication of the forecast coverage area.

20 Claims, 9 Drawing Sheets

(56) References Cited

U.S. PATENT DOCUMENTS

| | | |
|---|---|---|
| 9,747,568 B1 | 8/2017 | Bonawitz |
| 10,165,451 B1 | 12/2018 | Chukka et al. |
| 10,212,689 B2 * | 2/2019 | Deshpande ............ H04W 4/023 |
| 10,542,330 B2 | 1/2020 | Hopcraft et al. |
| 10,827,434 B1 * | 11/2020 | Marupaduga ......... H04W 16/00 |
| 10,880,754 B1 | 12/2020 | Orbigo et al. |
| 2001/0041554 A1 | 11/2001 | Rowell |
| 2002/0045940 A1 | 4/2002 | Giannetti et al. |
| 2002/0177856 A1 | 11/2002 | Richter et al. |
| 2002/0198859 A1 | 12/2002 | Singer et al. |
| 2003/0060200 A1 | 3/2003 | Soliman |
| 2003/0143578 A1 | 7/2003 | Pruitt et al. |
| 2003/0144018 A1 | 7/2003 | Minnick et al. |
| 2003/0228624 A1 | 12/2003 | Diller et al. |
| 2004/0054654 A1 | 3/2004 | Nomiyama et al. |
| 2004/0088048 A1 | 5/2004 | Richter et al. |
| 2004/0166858 A1 * | 8/2004 | Masuda ............ H04W 36/0061 455/436 |
| 2005/0130655 A1 * | 6/2005 | Lundh ............. H04W 36/00835 455/434 |
| 2016/0277955 A1 | 9/2016 | Suzuki et al. |
| 2017/0127373 A1 | 5/2017 | Deshpande et al. |

* cited by examiner

STAGE 2

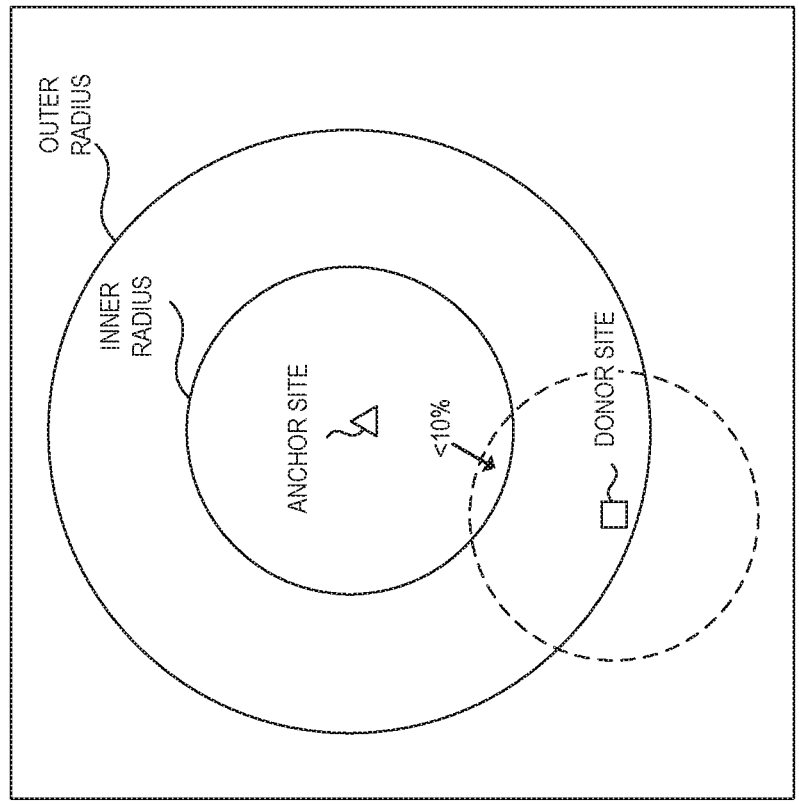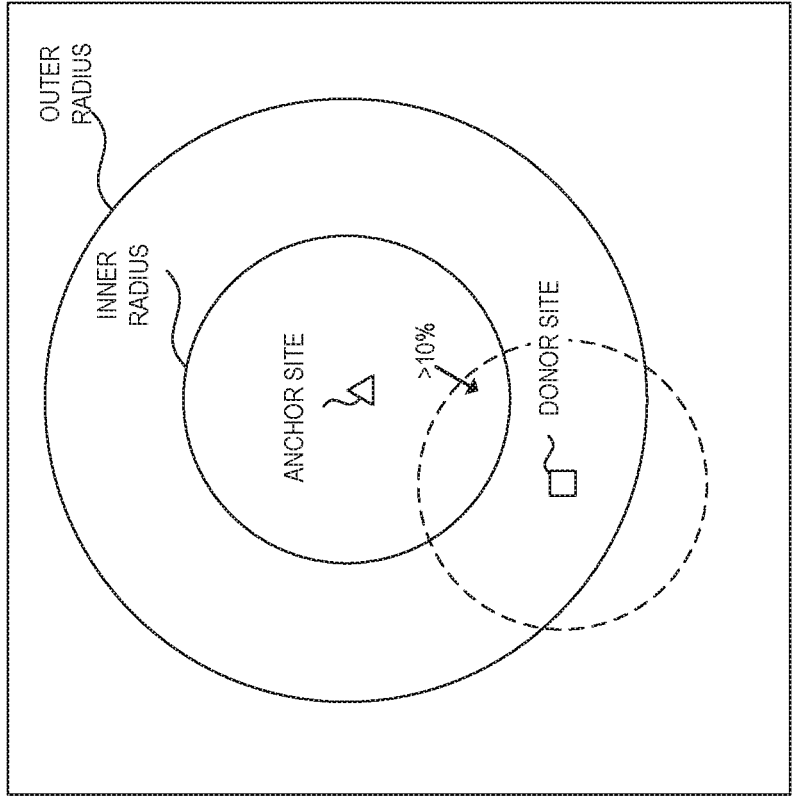

NETWORK PLANNING TOOL FOR FORECASTING IN TELECOMMUNICATIONS NETWORKS

BACKGROUND

Network planning and design is an iterative process, usually encompassing topological design, network synthesis, and network realization, and is aimed at ensuring that a new telecommunications network or service meets the needs of subscribers and operators. The process can be tailored according to each new network or service. The network planning process can begin with the acquisition of external information. This includes forecasts of how the new network/service will operate, the economic information concerning costs, and technical details of the network's capabilities. Topological design involves determining where to place components and how to connect them. Network synthesis involves determining the size of the components used, subject to performance criteria such as a grade of service. Network realization includes determining how to meet capacity requirements and ensure reliability within the network. These steps can be performed iteratively in parallel with one another.

During the process of network planning and design, estimates are made of the expected traffic intensity and traffic load that a network must support. If a network of a similar nature already exists, traffic measurements of such a network can be used to estimate the traffic load. If similar networks do not exist, then the network planner must use telecommunications forecasting methods to estimate the expected traffic intensity.

Accordingly, network planning tools include software and hardware components to evaluate the performance of existing networks and to plan a network layout of cell sites. However, these tools are complex and unreliable. For example, network operators can use logged information or signal measurement tools to measure a signal strength of cell sites and estimate how adding or removing a cell site would affect coverage. But, network planners need to obtain reliable insights quickly and based on limited information about cell sites of a proposed network, such as when proposing to combine cell sites of different networks in a merger.

BRIEF DESCRIPTION OF THE DRAWINGS

Embodiments of the present technology will be described and explained through the use of the accompanying drawings.

FIG. 4F illustrates a donor site that is classified for likely decommissioning based on an overlap of coverage areas between the donor site and an anchor site.

FIG. 4G illustrates a donor site that is classified for likely retaining based on on an overlap of coverage areas between the donor site and an anchor site.

Figure 2:
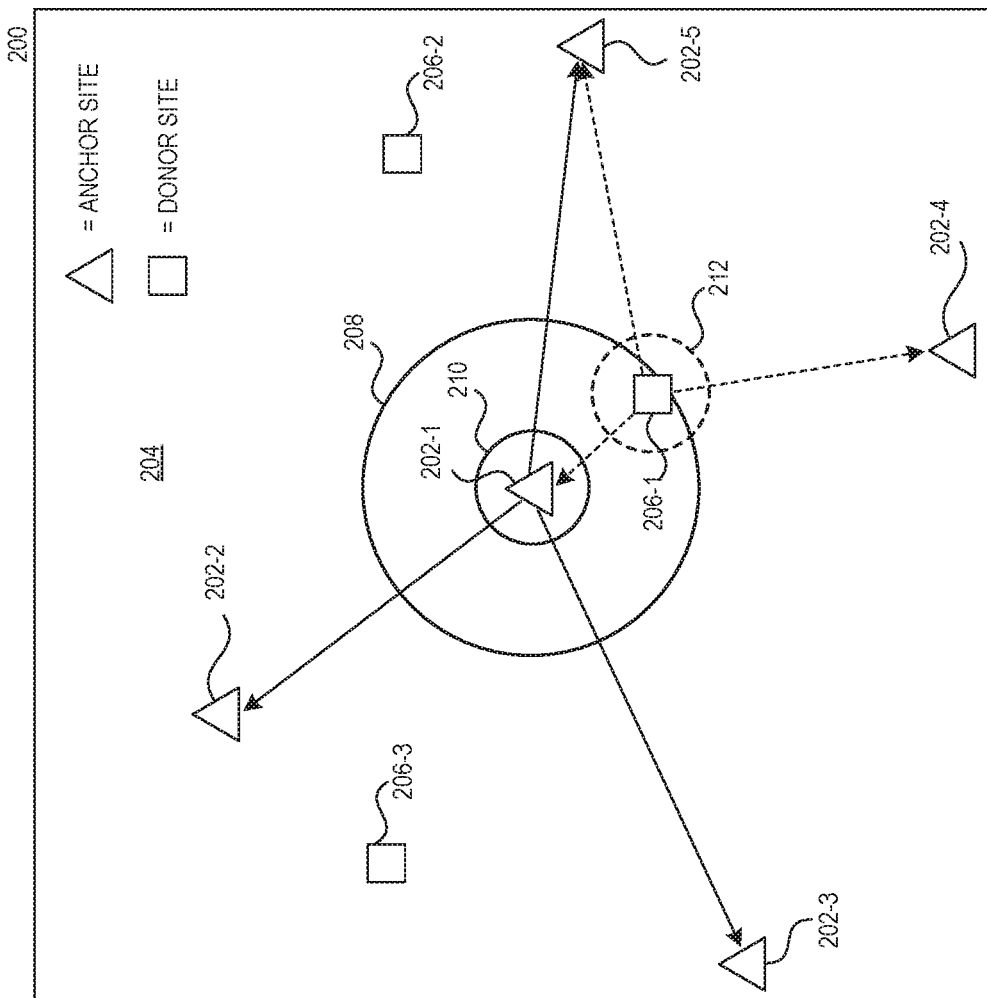
FIG. 2 illustrates an example of a simulated network that merges a donor network with an anchor network.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The disclosed technology relates to a network planning tool ("the tool") for predicting the effects of changing a telecommunications network by adding or removing cell sites. The tool aids a network planner, especially one having limited information about the characteristics or performance of cell sites. In one example, the tool can guide a network planner to determine whether decommissioning certain cell sites would result in acceptable or unacceptable performance degradation of subscriber services or, alternatively, whether retaining certain cell sites would meaningfully improve service coverage or performance to the subscribers.

In one example, a network planner may seek to predict the effects of a merger of a donor network of donor sites with an anchor network of anchor sites. An "anchor" network refers to an existing network that serves subscribers of the anchor network. A "donor" network refers to a network that serves subscribers of the donor network and can serve the subscribers of the anchor network if configured to do so. An anchor carrier and a donor carrier can operate respective networks independent of each other.

Overall, it would be cost effective to reduce the number of cell sites that are supported by a network. Moreover, merging the donor network with the anchor network may result in redundant coverage. Accordingly, the network planner may seek to evaluate whether it would be beneficial or detrimental to decommission or retain certain cell sites of the proposed network in accordance with certain criteria or conditions defined by the network planner. For example, the network planner may seek to avoid service degradation and/or seek to improve the service to anchor subscribers, while tolerating a threshold amount of service degradation to donor subscribers.

The disclosed technology allows a network planner to quickly determine a number of donor sites that can be decommissioned in a proposed network while, for example, avoiding unacceptable service degradation to subscribers. The technology further allows the network planner to readily forecast coverage or performance of cell sites in the proposed network. Many use cases of the disclosed technology exist. For example, the tools enable a network planner to readily understand where to strategically locate a new cell site to incrementally expand coverage of an existing network.

An aspect of the disclosed technology relates to estimating a number of cell sites of a donor network that can be decommissioned when merged with an anchor network without causing subscribers of the anchor network to experience any service degradation, and while causing subscribers of the donor network to experience only a threshold amount of service degradation. This is challenging in part because each network has a number of cell sites that are unevenly distributed throughout respective networks (e.g., rural Kansas has sparsely distributed sites compared to Manhattan). Moreover, the network planner may have more information about one network and not the other. Therefore, the disclosed planning tool can output a reliable estimate of donor sites that can be decommissioned without causing subscribers to experience an undesired amount of service degradation.

In one embodiment, the tool obtains cell site information of each network. The cell site information can include, for each cell site, an identifier and location information (e.g., geographic coordinates). The tool analyzes the cell site information to output an estimate of donor sites that could be decommissioned. In one example, the output can include a file with recommendations indicating donor sites that should be retained, and/or can display a list or present a geographic map that shows cell sites that are recommended to decommission and/or retain.

The tool can obtain cell site information from different sources, including lists and/or electronic geographic maps. Each donor site is evaluated in stages through different criteria to create a list of candidate sites that should be decommissioned and/or retained. Examples include a distance from a candidate site to a nearest anchor site, an average distance between a candidate site and multiple anchor sites, the location of a candidate site relative to a coverage area of an anchor site, and an overlap between coverage areas of a candidate site and an anchor site.

The tool can also forecast coverage or performance when adding or removing candidate sites to/from an existing network. In one example, the tool can simulate a layout of a network of cell sites to approximate how adding or removing candidate sites would affect coverage or performance. In one use case, the planning tool can simulate merging a donor network with an anchor network to identify coverage degradation to customers of the donor network that would result from decommissioning a candidate site. Other use cases include incremental coverage area expansion, improvements to existing coverage in particular areas, identifying redundant coverage, or to provide superior coverage in competitive markets.

In one implementation, the tool can simulate the network based on, for example, donor/anchor site list information (e.g., relative locations), any known boundaries of coverage, geolocated traffic files, and power boundaries of cell sites. The power boundaries, which corresponds to the actual best serving coverage or footprint of a site, together with the underlying traffic points within this boundary will determine how many customers will be degraded or not if and when a particular donor site is decommissioned. The simulated network utilizes this information to approximate a footprint (e.g., coverage area) of a candidate site (e.g., donor site) in an existing network (e.g., anchor network). The footprint of each candidate site can be defined in terms of a Voronoi polygon, which can be produced efficiently to generate an accurate simulation of each candidate site's footprint within an existing network. As such, network operators can efficiently forecast performance for a planned coverage, changes, or improvements, and evaluate use cases for network expansions, acquisitions, and mergers. Additional techniques are described in related U.S. patent application Ser. No. 15/931,574, filed May 13, 2020, titled "Network Planning Tool for Retention Analysis in Telecommunications Networks," which is incorporated by reference in its entirety for all purposes.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

Figure 1:
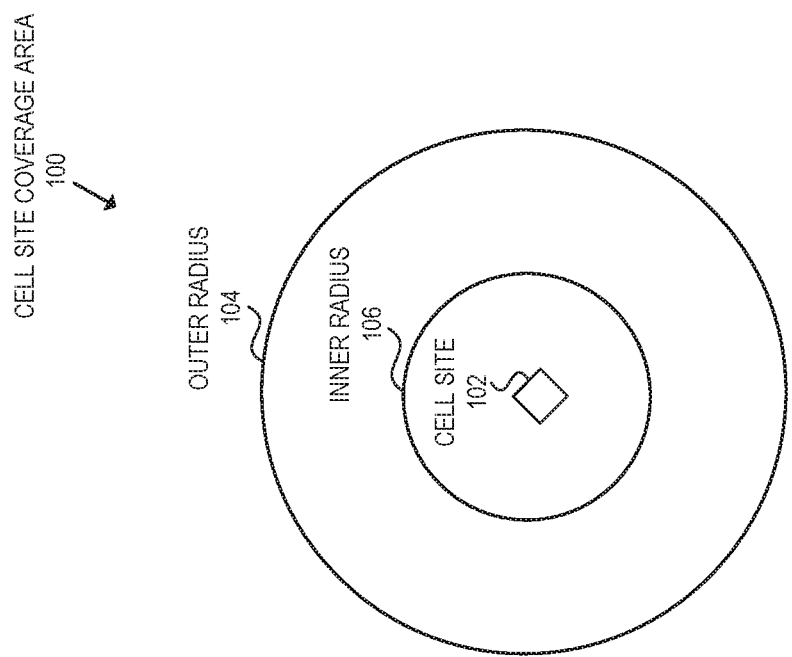
FIG. 1 illustrates an example of a coverage area of a cell site.

FIG. 1 is a block diagram that illustrates a coverage area 100 of a cell site 102. As used herein, a cell site (also called a cell tower or cellular base station) is a cellular-enabled mobile device site where antennae and electronic communications equipment are placed—typically on a radio mast, tower, or other raised structure—to create a cell (or adjacent cells) in a cellular network. The raised structure typically supports antenna and one or more sets of transmitter/receivers, digital signal processors, control electronics, a GPS receiver for timing, and/or primary and backup electrical power sources. As shown, the cell site 102 is at the center of the coverage area 100. The reach of a coverage area can depend on the location of the cell site 102. For example, a cell site that is unobstructed by physical structures has a maximum reach. The maximum reach of the cell site 102 is represented as an outer radius 104. The inner radius 106 represents a more limited reach of the cell site 102 that results from obstructions such as a home. Hence, the reach of the coverage 100 is more limited in a subscriber's home compared to outdoors. That is, the subscriber experiences performance degradation indoors compared to outdoors.

FIG. 2 is a block diagram that illustrates an example of a simulated network 200 that merges a donor network with an anchor network. As shown, the anchor network includes anchor sites 202-1 through 202-5 that are distributed over a geographic area 204. The donor network includes donor sites 206-1 through 206-3 that are distributed over the geographic area 204. In the illustrated example, the relative locations of the cell sites are analyzed to determine whether to decommission or retain any particular cell site. For example, an analysis of the simulated network 200 can involve estimating distances between the anchor site 202-1, neighboring anchor sites 202-2 through 202-4, and a neighboring donor site 206-1. The simulated network 200 also uses simulated coverage areas. For example, the anchor site 202-1 has an outer radius 208 and an inner radius 210, while the donor site 206-1 has an estimated average radius of 212. As shown, the donor site 206-1 is located within the outer radius 208 of the anchor site 202-1 but has a coverage area that partially extends beyond the reach of the anchor site 202-1.

Figure 3:
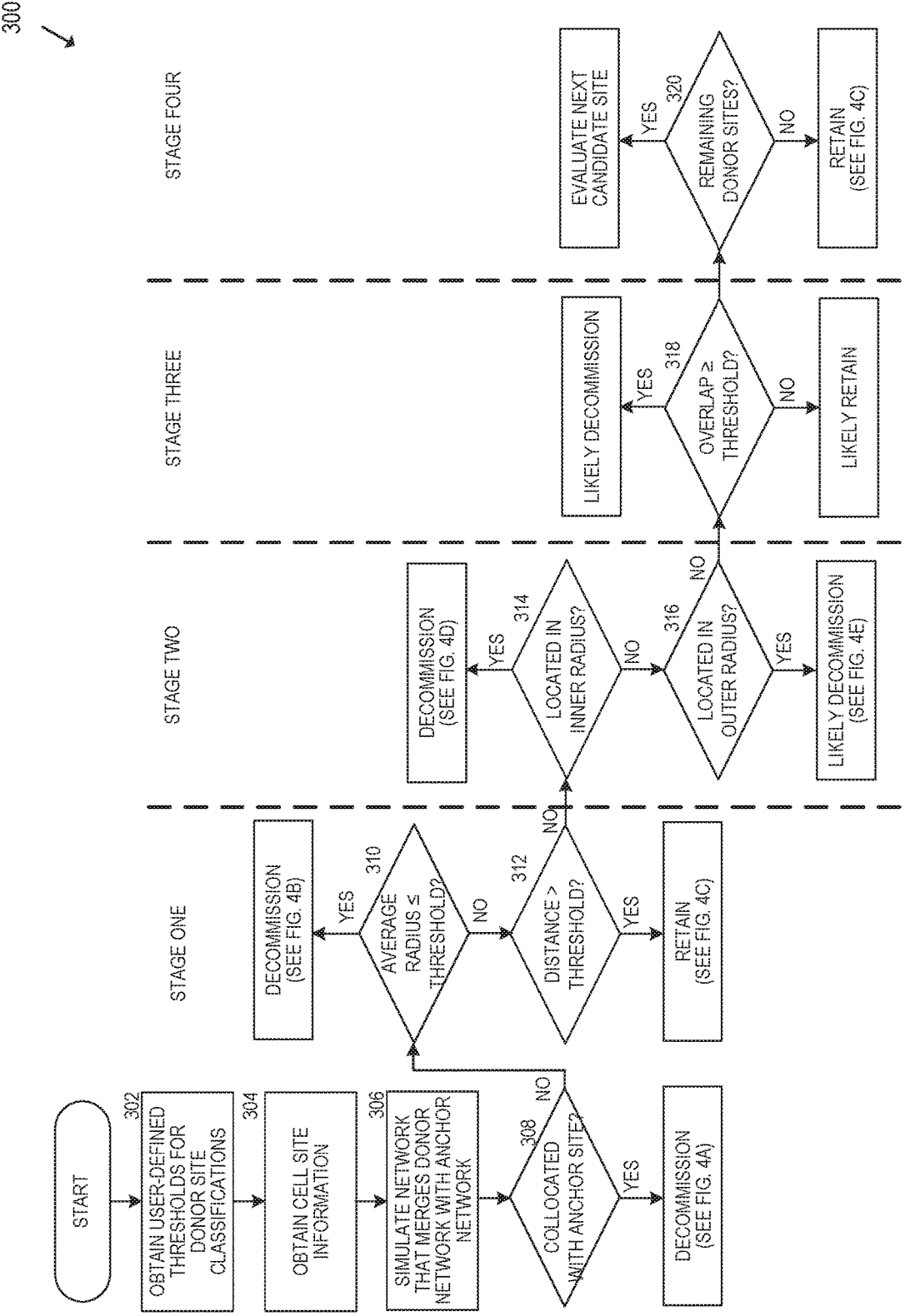
FIG. 3 is a flow diagram that illustrates a process for classifying cell sites of a virtual network that merges a donor network with an anchor network.

FIG. 3 is a flow diagram that illustrates a multi-stage classification process 300 performed by the tool for classifying cell sites of a simulated network that merges a donor network with an anchor network. In 302, the tool sets threshold values ("thresholds") that are used to classify the cell sites of the simulated network. For example, the tool can be embodied in a computer system that causes display of a user interface (UI) including one or more screens for a user to input or define threshold distances to other cell sites or define other measures that are used to classify cell sites during simulation of the proposed network.

In 304, the tool obtains cell site information of anchor sites and donor sites. The cell site information can include an identifier and an indication of a location for each of the cell sites. Each cell site is designated, based on its identifier, as either an anchor site of the anchor network that supports anchor subscribers or a donor site of the donor network that supports donor subscribers.

In 306, the tool simulates a virtual network based on the cell site information. For example, the virtual network can simulate a merger of the donor network with the anchor network. The tool can classify each donor site of the virtual network based in part on a spatial layout of the cell sites. For example, the tool can classify each donor site based on a measure of the donor site relative to one or more nearest anchor sites. As used herein, a "nearest" anchor site may refer to an absolute nearest anchor site or an anchor site that is located a threshold distance from the donor site. For example, a nearest anchor site can be equal to or less than a user defined threshold distance from a donor site. The result of the classification process 300 can be output on a computing device in a variety of ways including display on the UI administered the tool.

In the illustrated example, each candidate site (e.g., donor site) is evaluated in accordance with a four-stage classification process 300 through which each candidate site is classified as likely decommission, decommission, likely retain, or retain. The candidate site may not be passed to the next stage of the classification process upon being classified. The candidate site is evaluated in one stage of the classification process 300 and passed to a next stage only if the candidate donor site was not already classified, could be reclassified, or could be further classified in later stages. In general, at the first stage ("stage one"), the candidate site is evaluated based on distance(s) to nearest anchor site(s). At a second stage ("stage two"), the candidate site is evaluated based on its location relative to a coverage area of a nearest anchor site. At a third stage ("stage three"), the candidate site is evaluated based on an overlap of coverage areas between the candidate site and an anchor site. At a fourth stage ("stage four"), the candidate site is classified for retaining, if not classified at in an earlier stage.

Figures 4A, 4B, 4C:
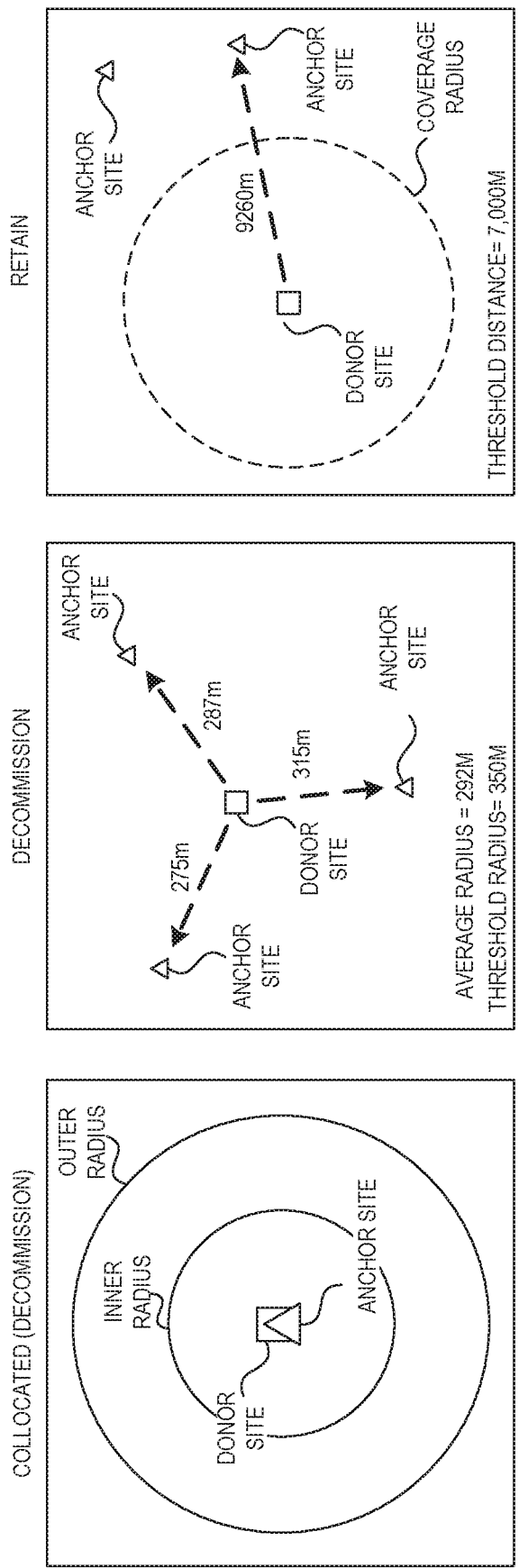
FIG. 4A illustrates an example of a donor site collocated with an anchor site.
FIG. 4B illustrates a donor site classified for decommissioning based on an average radius of the donor site relative to multiple nearest anchor sites.
FIG. 4C illustrates a donor site classified for retaining based on a distance of the donor site to an anchor site.

In 308, at stage one, the tool identifies collocated cell sites. For example, FIG. 4A is a block diagram that illustrates a donor site that is collocated with an anchor site. As shown, the location of the anchor site and the donor site overlap such that their coverage is redundant. In general, cell sites that are collocated are within a threshold distance of each other. For example, a donor sight that is within 100 meters of an anchor site may be deemed "collocated" to the anchor site if the threshold distance is 200 meters. The threshold distance can be predefined by a user or set by the tool. A collocated site may be classified to decommission due to the redundant coverage.

In 310, at stage one, the tool compares the average radius of the candidate site to a predefined average radius. In one example, the average radius is calculated by taking an average of the distances between multiple neighboring cell sites and the candidate site. If the average radius is less than or equal to a threshold distance, the candidate site is classified for decommissioning. For example, FIG. 4B illustrates a donor site classified for decommissioning based on an average radius to multiple nearest anchor sites. As shown, the average radius of 292 meters is less than the threshold radius of 350 meters. The threshold radius can be input by a user (e.g., network planner) and/or set by the tool.

In 312, if the candidate site was not classified for decommissioning, the tool determines whether the distance from the candidate site to a nearest anchor site is greater than a threshold distance. The threshold distance can be input by a user and/or set by the tool. If so, the candidate site is classified for retaining. For example, FIG. 4C illustrates a donor site classified for retaining based on a distance to an anchor site. As illustrated, the donor site is 9,260 meters from a nearest neighboring anchor site, which is greater than a 7,000-meter threshold distance. As such, the donor site is classified for retaining.

Figure 4E:
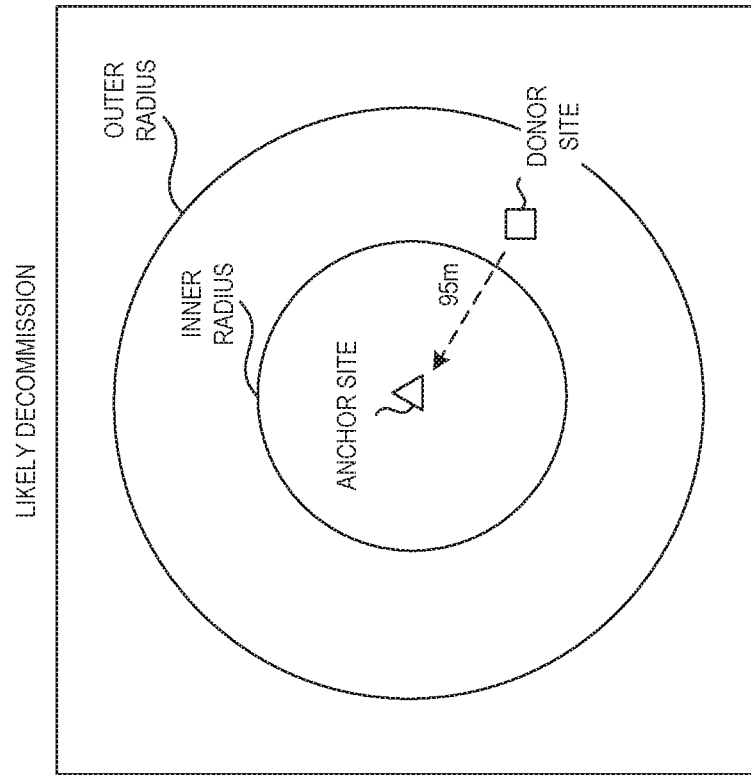
FIG. 4E illustrates a donor site classified for likely decommissioning based on the location of the donor site in an outer radius of an anchor site.
Figure 4D:
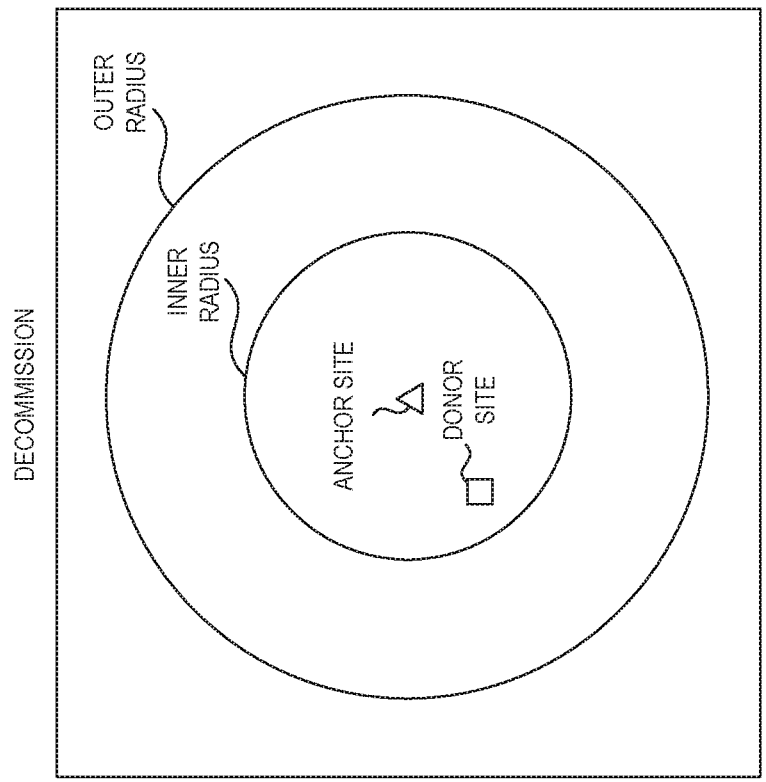
FIG. 4D illustrates a donor site classified for decommissioning based on the location of the donor site in an inner radius of an anchor site.

In 314, at stage two, the candidate site is evaluated based on the location of the donor site relative to a coverage area of a nearest anchor site. If the candidate site is located in an inner radius of the nearest anchor site, the candidate site is classified for decommissioning. For example, FIG. 4D is a block diagram that illustrates a donor site classified for decommissioning based on the location of the donor site in an inner radius of an anchor site.

In 316, at stage two, the candidate site is evaluated to determine whether its location is in the outer radius of the nearest anchor site. If so, the candidate site is classified for likely decommissioning. For example, FIG. 4E illustrates a donor site classified for likely decommissioning because the donor site is located in the outer radius of the nearest anchor site.

In 318, at stage three, the candidate site is evaluated to determine whether its coverage area overlaps with the coverage area of a nearest anchor site. If the overlap is an amount (e.g., percentage) greater than or equal to a threshold amount, then the candidate site is classified for likely decommissioning because the coverage of the candidate site is mostly redundant. For example, FIG. 4F illustrates the candidate site classified for likely decommissioning because the overlap of its coverage area with the coverage area of an anchor site is greater than a threshold amount. In particular, the illustrated example shows that the overlap is greater than or equal to 10 percent. On the other hand, FIG. 4G illustrates that the coverage area of the candidate site is less than the threshold amount of 10 percent. As such, the donor site is classified for likely retaining. The threshold amount can be input by a user and/or set by the tool.

Figure 4H:
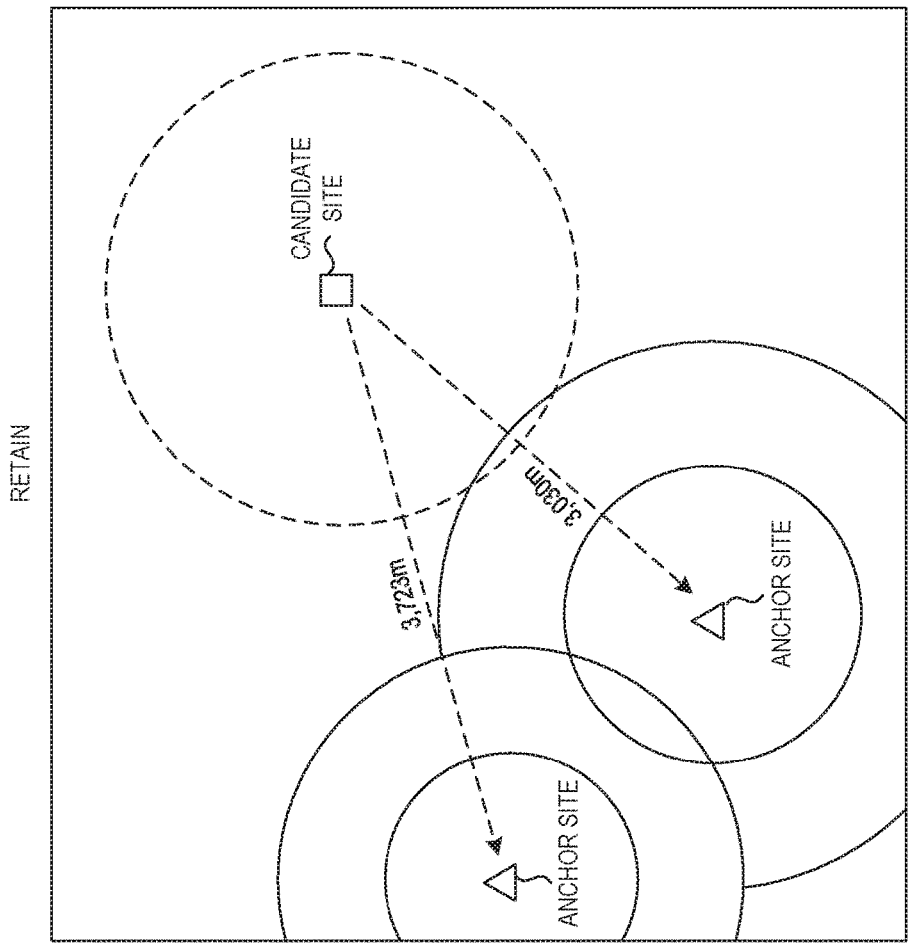
FIG. 4H illustrates a donor site that is classified for retaining based on the distances of the donor site to anchor sites.

In 320, the candidate site is classified for retaining. For example, FIG. 4H illustrates a candidate site that is classified for retaining because the candidate site did not satisfy criteria of prior stages. The classification process 300 proceeds to evaluate any remaining candidate site through the four-stage classification process 300.

The planning tool can output useful information in a variety of formats. The output can be generated in response to a query input by a user to a computing device that displays the output. For example, the output can include an indication of a total number of donor sites that are classified for decommissioning relative to a total number of donor sites that are classified for retaining. Hence, the planning tool can provide an estimate of a total number of donor sites that can be decommissioned in a proposed network.

Figure 5:
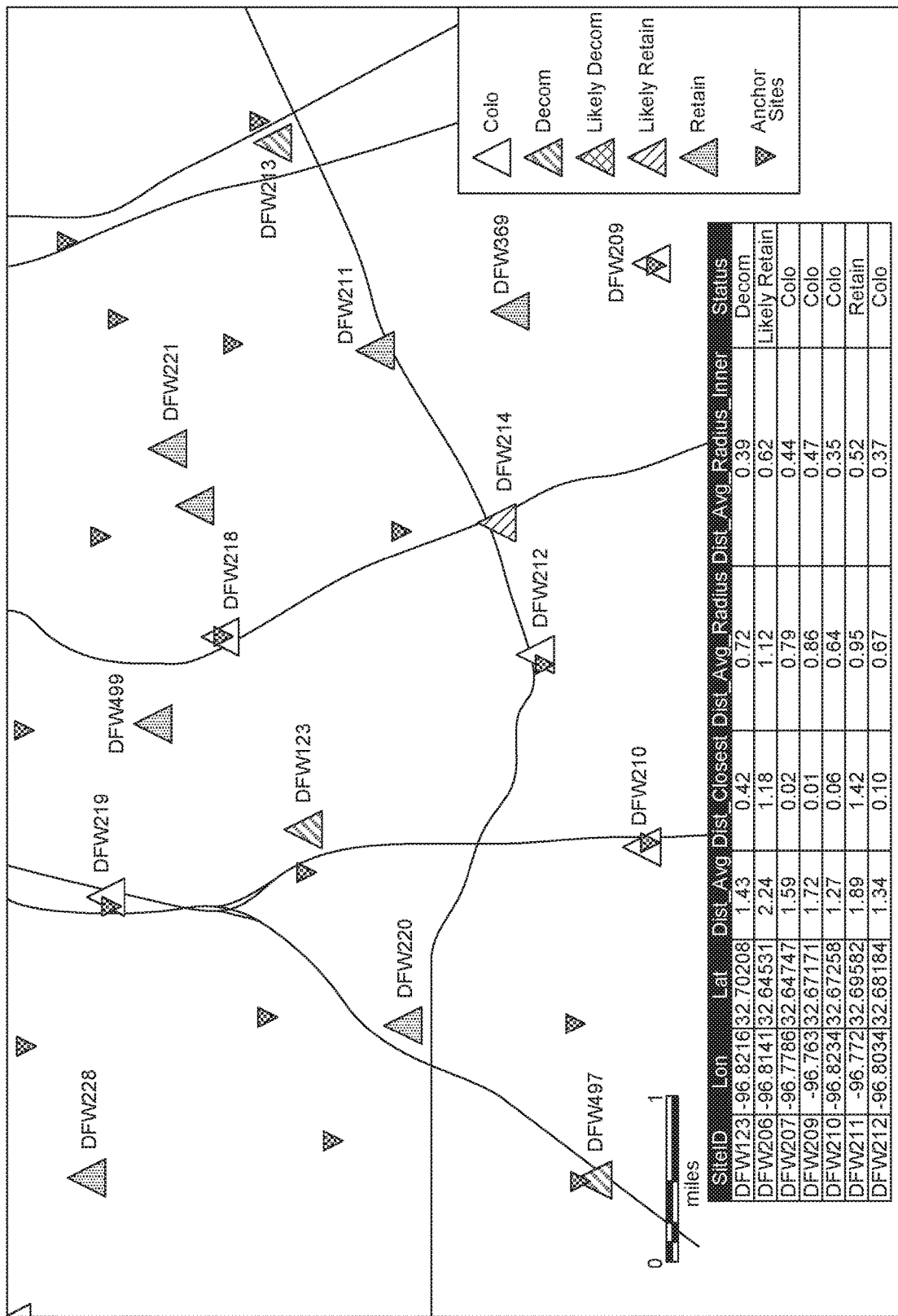
FIG. 5 illustrates a geographic map of classified cell sites including donor sites and anchor sites.

FIG. 5 illustrates an output including a geographic map of classified donor sites and anchor sites. Specifically, the output includes a geographical map that depicts a location, a classification, and an identification of each donor site relative to locations of the anchor sites. Each donor site of the combined network is classified as either being collocated, decommission, likely decommission, likely retain, or retain. The display also includes a table of data that supports each classification status. The classification process 300 is not limited to simulating a merger between existing donor sites with anchor sites. In other use cases, the anchor network is an existing network and the donor network is a hypothetical network that is planned to expand the coverage of the anchor network. As such, the donor network can represent additional anchor sites.

The disclosed planning tool can forecast coverage or performance of a candidate site. In one example, the planning tool can simulate a layout of a network of cell sites to approximate how adding or removing candidate sites would affect coverage, and thereby affect service performance. In one use case, the planning tool can simulate merging a donor network with an anchor network to identify coverage degradation to customers of the donor network that would result from decommissioning a candidate site. Other use cases include incremental coverage area expansion, improvements to existing coverage in particular areas, identifying redundant coverage, or to provide superior coverage in competitive markets.

Figure 6:
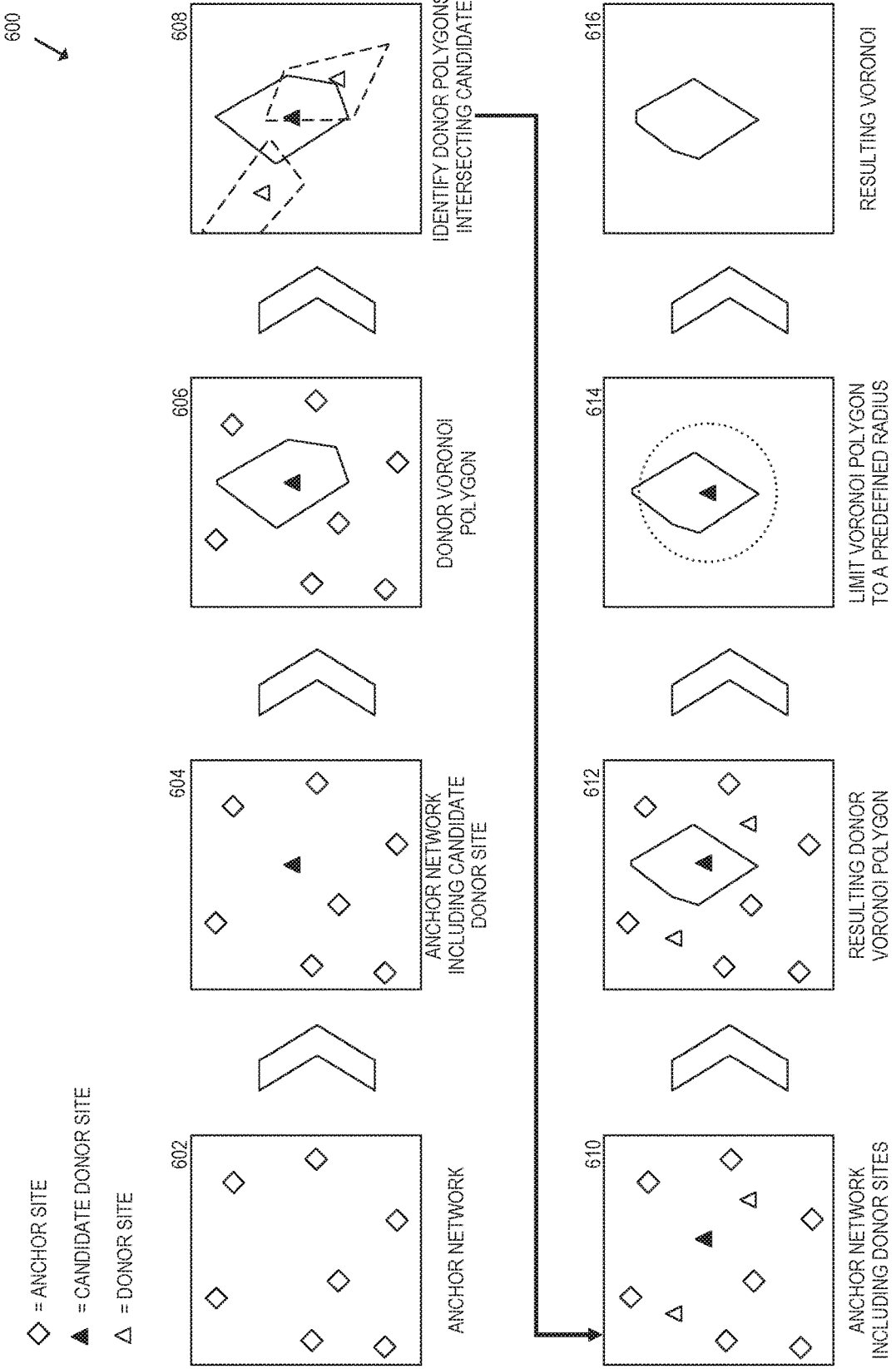
FIG. 6 is a block diagram that illustrates a process for forecasting a coverage area of a donor site in a network of anchor sites.

FIG. 6 is a block diagram that illustrates a process 600 for forecasting coverage of a donor site in a network of anchor sites. In one example, the tool can receive a request to predict an effect on subscribers of a proposed network caused by decommissioning a candidate site. As described earlier, the tool obtains cell site information of anchor sites and a candidate site (e.g., donor site or anchor site). The cell site information can include relative locations of the cell sites and coverage information, geolocated traffic information, or power boundary information. The coverage information can be based on a coverage experienced by subscribers of the anchor network and subscribers of a donor network including the candidate site. The information is used to build a simulation that can forecast the coverage area of the candidate site.

In 602, the tool simulates a spatial layout of anchor sites of an anchor network as a virtual network. The simulation of 602 represents an existing, unchanged network prior to simulating a proposed network. In the illustrated example, the virtual network represents an existing anchor network where the network planner seeks to simulate a merger of a donor network with the anchor network. However, the network planner may seek to use the simulation to improve the anchor network with expanded coverage, or seek to model a change in an environment affecting a coverage area of the anchor network.

In 604, the simulation adds a candidate site to the simulated anchor network to thereby produce a planned network with only one candidate site. In the illustrated example, the candidate site is a donor site of a donor network. However, the candidate site could represent another anchor site in other examples for other use cases.

In 606, the simulation adds an estimation of a coverage area of the candidate site in the proposed network relative to the multiple anchor sites in the virtual network. The estimated coverage area of the candidate site forms a polygon-shaped coverage area in the spatial layout of the virtual network. In the illustrated example, the polygon-shaped coverage area is a Voronoi polygon. Voronoi polygons can be produced efficiently to generate an accurate representation of each donor site's coverage area in the anchor network. Voronoi polygons define individual areas of influence around a set of points whose boundaries define the area that is closest to each point relative to all other points. They are mathematically defined by the perpendicular bisectors of the lines between all points.

In 608, the planning tool simulates a spatial layout of the candidate site and neighboring donor site(s). The coverage areas of the neighboring donor sites are also estimated as polygon-shaped coverage areas. The simulation can modify the polygon-shaped coverage area of the candidate site relative to intersections with the polygon-shaped coverage areas of the neighboring sites. For example, the simulation can remove portions of the candidate site's estimated coverage area that overlaps with the estimated coverage areas of the neighboring sites. Therefore, the portions that are removed are based on the intersections of the polygon-shaped coverage areas of the cell sites.

In 610, the simulated layout of the anchor network is modified to include the candidate site and the neighboring donor sites. Hence, the simulation merges the simulated donor sites with the simulated anchor network to produce a simulated merged network, also referred to as the proposed or planned network.

In 612, the simulation is modified to show the estimated coverage area of the candidate site relative to the anchor sites and donor sites. The estimated coverage area shown was adjusted in 608 based on the overlap of the coverage areas of the neighboring donor sites.

In 614, the estimated coverage area is pruned to remove areas of the candidate site that exceed a threshold radius. The threshold radius can be defined by a user and/or set by the planning tool. For example, the tool can receive user input that defines the coverage radius before commencing the simulation. As such, the estimated coverage is limited up to a certain radius to simulate typical site coverage that does not go infinite in radius.

In 616, the planning tool can output information indicative of the forecast coverage of the candidate site. Thus, the output can include an indication of a resulting coverage area of the candidate site as the forecast coverage in the merged network.

The tool can use the forecast coverage to simulate the effect of decommissioning the candidate site, which can include service degradation. For example, the planning tool can estimate a measure indicative of subscriber degradation in the forecast coverage should the candidate site be decommissioned in a merger between the anchor network and a donor network including the candidate site. In another example, the tool can rank each donor site based on an approximate service degradation caused by decommissioning that donor site. The output can include the ranking of the donor sites on a display device of a computing device operated by the network planner. For example, the output can include a geographic map such as that shown in FIG. 4.

In some embodiments, the output can include notifications that indicate risk associated with decommissioning the candidate site. For example, a "high risk" notification can indicate that decommissioning the candidate site would result in an unacceptable amount of service degradation to donor subscribers in the merged network. A "moderate risk" notification can include a warning to consider the coverage to existing subscribers of the anchor network by retaining the candidate site or consider maintenance costs for retaining the candidate site. A "low risk" notification can indicate that decommissioning the candidate site will result in an acceptable amount of service degradation to donor subscribers. An unacceptable or acceptable amount of service degradation can be determined relative to thresholds defined by a user and/or set by the tool.

Figure 7:
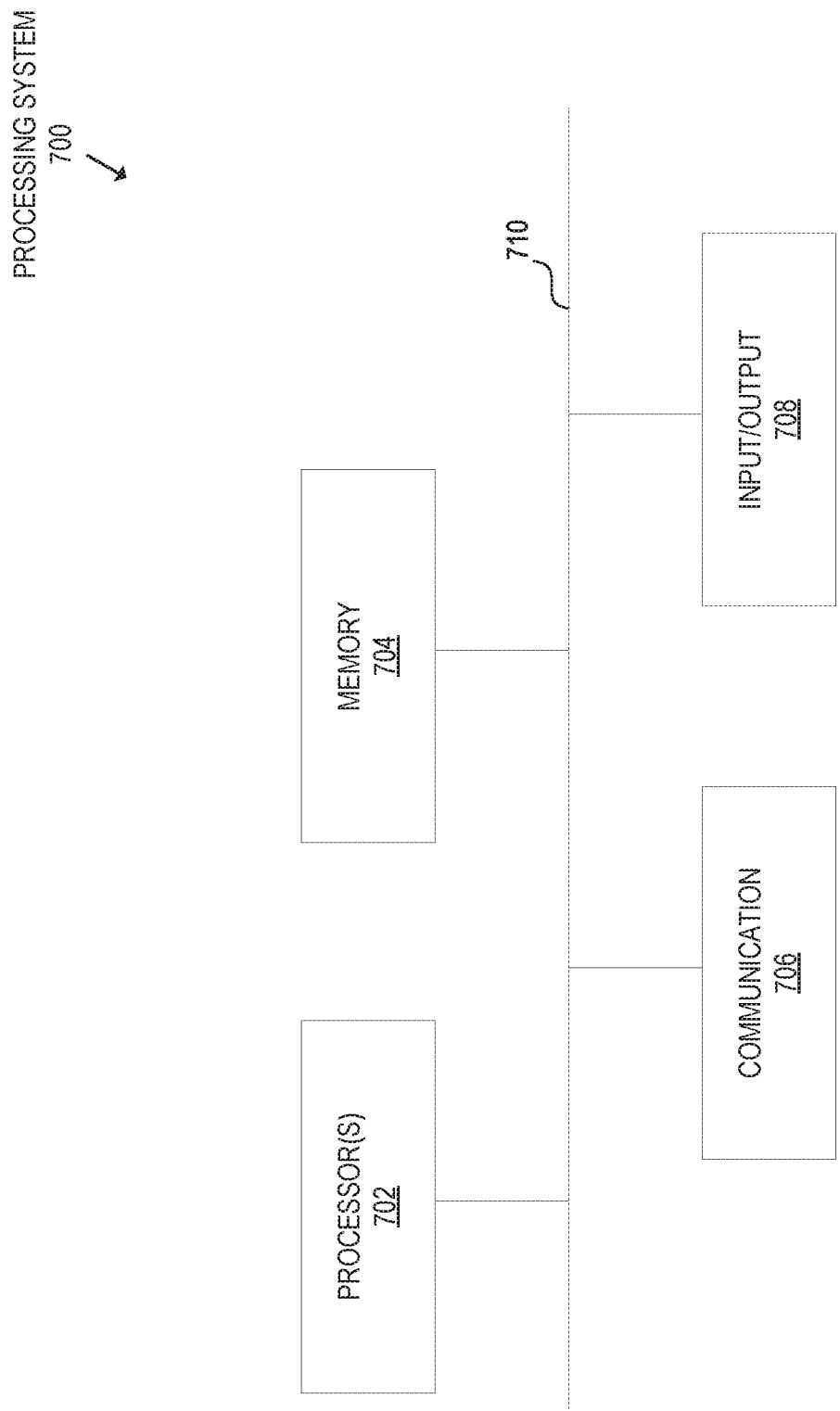
FIG. 7 is a block diagram that illustrates an example processing system in which aspects of the disclosed technology can be embodied.

FIG. 7 is a block diagram illustrating an example of a processing system 700 in which at least some operations described herein can be implemented. The processing system 700 represents a system that can run any of the methods/algorithms described herein (e.g., the network panning tool). For example, any network access device (e.g., UE) component of an IMS capable network can include or be part of a processing system 700. The processing system 700 can include one or more processing devices, which can be coupled to each other via a network or multiple networks. A network can be referred to as a communication network or telecommunications network.

In the illustrated embodiment, the processing system 700 includes one or more processors 702, memory 704, a communication device 706, and one or more input/output (I/O) devices 708, all coupled to each other through an interconnect 710. The interconnect 710 can be or include one or more conductive traces, buses, point-to-point connections, controllers, adapters and/or other conventional connection devices. Each of the processor(s) 702 can be or include, for example, one or more general-purpose programmable microprocessors or microprocessor cores, microcontrollers, application specific integrated circuits (ASICs), programmable gate arrays, or the like, or a combination of such devices.

The processor(s) 702 control the overall operation of the processing system 700. Memory 704 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 704 can store data and instructions that configure the processor(s) 702 to execute operations in accordance with the techniques described above. The communication device 706 can be or include, for example, an Ethernet adapter, cable modem, Wi-Fi adapter, cellular transceiver, Bluetooth transceiver, or the like, or a combination thereof. Depending on the specific nature and purpose of the processing system 700, the I/O devices 708 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks can instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it can be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 700 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments can be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further any specific numbers noted herein are only examples: alternative implementations can employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

The invention claimed is:

1. A computer-implemented method for forecasting a coverage area of a candidate site in an anchor network, the method comprising:
   obtaining cell site information of multiple anchor sites of the anchor network and of the candidate site;
      wherein the cell site information includes at least two of—
         relative locations of the multiple anchor sites,
         coverage information of the multiple anchor sites and the candidate site,
         geolocated traffic information of the anchor network and the candidate site, or
         power boundary information associated with an anchor site of the anchor network;
   simulating a spatial layout of the multiple anchor sites in a virtual network;
   estimating a coverage area of the candidate site in the virtual network;
      wherein the estimated coverage area of the candidate site forms a polygon-shaped coverage area in the spatial layout of the virtual network;
   modifying the polygon-shaped coverage area of the candidate site relative to an intersection with a coverage area of a neighboring site;
   pruning the modified coverage area of the candidate site that exceeds a predefined coverage radius for the candidate site; and
   causing an output, on a computing device, that provides an indication of the pruned coverage area as the forecast coverage area of the candidate site.

2. The method of claim 1 further comprising, prior to estimating the coverage area of the candidate site:
   receiving a request to predict an effect on subscribers of a planned network caused by decommissioning the candidate site,
      wherein the planned network merges a donor network with the anchor network, and
      wherein the candidate site is a donor site of the donor network.

3. The method of claim 1, wherein the candidate site is a donor site of a donor network that includes multiple donor sites, and simulating the spatial layout of the multiple anchor sites in the virtual network comprises:
   simulating the anchor network; and
   adding only the candidate site to the simulated anchor network to thereby produce the virtual network,
      wherein the estimated coverage area is obtained without other donor sites being included in the virtual network.

4. The method of claim 1, wherein the candidate site is a first donor site of a donor network that includes multiple donor sites, and the neighboring site is a second donor site of the donor network.

5. The method of claim 1, wherein modifying the polygon-shaped coverage area of the candidate site comprises:
   adding the neighboring cell site to the virtual network;
   estimating the coverage area of the neighboring cell site as a polygon-shaped coverage area; and
   pruning the polygon-shaped coverage area of the candidate site relative to an intersection with polygon-shaped coverage area of the neighboring site.

6. The method of claim 1, wherein the candidate site is a donor site of a donor network including multiple donor sites, and the coverage area of the neighboring site is a polygon-shaped coverage area of another donor site.

7. The method of claim 1 further comprising, prior to causing the output including the indication of the forecast coverage area:
   simulating decommissioning of the candidate site in the virtual network; and
   approximating a service degradation based on the decommissioning, wherein the output includes an indication of the approximate service degradation caused by decommissioning the candidate site.

8. The method of claim 1, wherein the candidate site belongs to a donor network of donor sites and the virtual network merges the donor network with an anchor network, the method further comprising:
   ranking each donor site based on an approximate service degradation caused by decommissioning the donor site in the virtual network.

9. The method of claim 1, wherein the polygon-shaped coverage area is a Voronoi polygon-shaped coverage area.

10. The method of claim 1 further comprising:
    causing an output of a geographic map on a display device of the computing device, the geographic map simulating a location, classification, and identification of the candidate site relative to the multiple anchor sites.

11. The method of claim 1 further comprising, prior to causing the output including the indication of the forecast coverage area:
    estimating a measure indicative of subscriber degradation in the forecast coverage should the candidate site be decommissioned in a merger between the anchor network and a donor network including the candidate site.

12. The method of claim 1 further comprising, prior to simulating the spatial layout of the multiple anchor sites in the virtual network:
    receiving user input including the predefined coverage radius.

13. The method of claim 1, wherein the candidate site is a donor site of a donor network of multiple donor sites, wherein the donor network represents a network operated independent of the anchor network, and wherein the donor network and the anchor network represent co-existing telecommunications networks.

14. The method of claim 1, wherein the anchor network is an existing anchor network and the candidate site is a candidate anchor site that expands a coverage area of the existing anchor network.

15. The method of claim 1, wherein the virtual network represents any of:
an improvement to a coverage area of an existing anchor network, or
a change to an environment affecting a coverage area of the anchor network.

16. The method of claim 1, wherein the coverage information is based on a coverage experienced by subscribers of the anchor network and subscribers of a donor network including the candidate site.

17. The method of claim 1, wherein the candidate site is a donor site of a donor network of multiple donor sites, wherein the output includes an indication of one or more of multiple risk levels comprising:
a high risk level indicating that decommissioning of the candidate site would degrade coverage to subscribers of the donor network merged with the anchor network,
a moderate risk warning to consider coverage to existing subscribers of the anchor network by retaining the candidate site or maintenance costs for retaining the candidate site, and
a low risk indicating that decommissioning of the candidate site results in an acceptable amount of degraded coverage to subscribers of the donor network merged with the anchor network.

18. A system comprising:
a processor; and
memory containing instructions that, when executed by the processor, cause the system to:
obtain cell site information for each of multiple cell sites of multiple networks,
wherein the cell site information includes an identifier, coverage information, geolocated traffic information, and equal power boundary information for each cell site; and
wherein each cell site is either an anchor site of an anchor network that supports anchor subscribers or a donor site of a donor network that supports donor subscribers;
simulate a spatial layout of multiple anchor sites of the anchor network;
add a candidate site of the donor network to the simulated anchor network to thereby produce a planned network;
estimate a coverage area of the candidate site in the planned network relative to the multiple anchor sites;
simulate a spatial layout of multiple donor sites of the donor network including the candidate site and a neighboring donor site;
adjust the estimated coverage area of the candidate site by causing the processor to:
estimate an overlap of a coverage area of the neighboring donor site with the estimated coverage area of the candidate site; and
remove a portion of the overlap from the estimated coverage area of the candidate site; and
merge the simulated donor network with the simulated anchor network to produce a simulated merged network; and
output an indication of a resulting coverage area of the candidate site as a forecast coverage area in the merged network.

19. The system of claim 18, wherein the estimated coverage area of the candidate site is based in part on the geolocated traffic information and the power boundary information.

20. A non-transitory computer-readable medium with instructions stored thereon that, when executed by a processor, cause the processor to perform operations comprising:
receiving a request to determine an effect of decommissioning a candidate site of a first network merged with a second network,
wherein the first network includes multiple first sites and the second network includes multiple second sites, and
wherein the second network is operated by a common carrier and the candidate site is operated by a carrier other than the common carrier;
simulate a spatial layout including the multiple second sites of the second network and the candidate site;
estimating a coverage area of the candidate site in as a polygon-shaped coverage area in the spatial layout;
adjusting the polygon-shaped coverage area of the candidate site relative to a coverage area of a neighboring first site; and
generating an indication of the effect for decommissioning the candidate site including any of:
an unacceptable amount of degrade coverage,
a warning to consider coverage to existing subscribers of the second network by retaining the candidate site or maintenance costs for retaining the candidate site, and
an acceptable amount of degraded coverage.

* * * * *